United States Patent [19]

Krick

[11] Patent Number: 4,769,809
[45] Date of Patent: Sep. 6, 1988

[54] METHOD OF AND CIRCUIT ARRANGEMENT FOR THROUGH-SWITCHING BROADBAND DIGITAL SIGNALS WITHOUT PHASE JUMP IN A SYNCHRONOUS BROADBAND COMMUNICATION NETWORK

[75] Inventor: Wolfgang Krick, Lauf, Fed. Rep. of Germany

[73] Assignee: U.S. Philips Corporation, New York, N.Y.

[21] Appl. No.: 838,506

[22] Filed: Mar. 11, 1986

[30] Foreign Application Priority Data

Mar. 16, 1985 [DE] Fed. Rep. of Germany ....... 3509511

[51] Int. Cl.$^4$ ............................................. H04Q 11/04
[52] U.S. Cl. ...................................... 370/58; 375/40; 370/100
[58] Field of Search .................... 370/58, 91, 100, 102; 375/38, 40, 118; 340/825.01, 825.03

[56] References Cited

U.S. PATENT DOCUMENTS

| | | | |
|---|---|---|---|
| 3,622,885 | 11/1971 | Kruszynski | 375/38 |
| 3,628,149 | 12/1971 | Swan | 375/40 |
| 4,234,956 | 11/1980 | Adderley et al. | 375/38 |
| 4,270,203 | 5/1981 | Collins et al. | 370/102 |
| 4,307,462 | 12/1981 | Mazzocchi | 370/102 |
| 4,323,790 | 4/1982 | Dunning et al. | 370/102 |
| 4,395,772 | 7/1983 | Trested, Jr. | 375/40 |
| 4,477,895 | 10/1984 | Casper et al. | 375/40 |

FOREIGN PATENT DOCUMENTS 1510015 5/1978 United Kingdom .

OTHER PUBLICATIONS

Schaffer et al., "Die Evolution des ISDN zum Breitbandigen Universalnetz", NET vol. 39, (1985), vol. 1, pp. 20–25.

D Bottle, "Switching of 140 M Bits Signals in Broadband Communication Systems", Electrical Communication, vol. 58, No. 4, pp. 450–452.

Kummerow, "Bild–und Tonlibertragung, in Glasfaser–Breitsand–Ortsnetzen Teil System Kozept" ntz vol. 38, (1985), No. 3, pp. 140–144.

Rehm et al., "Bildubertragungweg mit Frequenz Modulation in Einen Glasfaser–Teilnehmernetz Frequency, vol. 38, No. 4, pp. 217–222.

Primary Examiner—Robert L. Griffin
Assistant Examiner—Stephen Chin
Attorney, Agent, or Firm—Thomas A. Briody; Jack E. Haken; Anne E. Barschall

[57] ABSTRACT

Broadband digital signals in a broadband communication network asynchronously operated space-division-multplex switching networks are arranged in the nodes. This asynchronous operating mode of the space-division-multiplex switching networks requires, in constructing the broadband communication network, the use of asynchronous multiplexers with complicated stuffing methods. For the implementation of a synchronous broadband communication network, the regenerated broadband digital signal is applied to an elastic store, entering the data into the elastic store being effected with the regenerated clock and reading with the central network clock. In the absence of a broadband digital signal because of a "not switched-through" switching state or a failing digital line, a switch to a broadband, network synchronous signal or to a substitution path is effected.

6 Claims, 1 Drawing Sheet

METHOD OF AND CIRCUIT ARRANGEMENT FOR THROUGH-SWITCHING BROADBAND DIGITAL SIGNALS WITHOUT PHASE JUMP IN A SYNCHRONOUS BROADBAND COMMUNICATION NETWORK

BACKGROUND OF THE INVENTION

1. Field of the Invention

The invention relates to a method of through-switching broadband digital signals without phase jump, in a synchronous broadband communication network which includes asynchronously operated space-division-multiplex switching networks, in which the broadband digital signals are regenerated individually.

2. Prior Art

In future integrated communication networks, new services are planned which require larger bandwidths than the narrowband ISDN-services (Integrated Services Digital Networks). Picture telephones (video telephones) require a bandwidth of 5 MHz or a transmission rate of a few Mbit/s to some 10 Mbit/s per channel. For reliable operation of such broadband networks, synchronization measures plan an important part. In node-synchronization, the network clock which is the central clock for through-switching in the relevant node is used to provide synchronism between incoming signals. In source-sink synchronization, the frequency difference between the source reference clock and the central network clock is transmitted, for example as a delta coded auxiliary signal in the multiplex signal, to the sink to enable a clock synchronization of the sink. The clock synchronization is independent of the network clock and which uses a stuffing method.

To synchronize a circuit, the source clock is transparently conveyed through the network to the sink. To synchronize a network, the clock for the sources is supplied from the network. In broadband communication networks, the first node, close to the subscriber, is often still used in common for broadband and narrowband transmission. The node located at the terminating point of, for example, the optical fibre transmission path comprises a multiplexer/demultiplexer through which there is access to the broadband switching network, to the voice/data (ISDN) network, and to the program coupler in the distribution networks. The broadband switching network, the voice/data (ISDN) coupling arrangements, and the program coupler are controlled by a control unit included in the node. Separate transmission of the respective digital signals in the broadband and the narrowband networks is effected from this common node. For switch-through in the broadband switching network, a space-division-multiplex switching network is often used. A time-division-multiplex switching network is often used for the voice/data (ISDN) coupling arrangement. To synchronize this node, the central network clock is applied to it via the standard frequency distribution network. In the periodical "net", Vol. 39 (1985), No. 1, pages 20 to 25, the system architecture for a broadband communication network and the structure of a broadband coupling arrangement (broadband switching network) is described in detail. As can be seen therefrom, the time-division-multiplex method used for switching purposes in narrowband switching networks (voice/data (ISDN) switching network) will not be advantageous in the near future for broadband signals up to 140 Mbit/s, as the cost and design efforts for frame and clock phase synchronization will be excessive. Thus, broadband switching networks are presently implemented in the space-division-multiplex mode. Page 24 of said publication discloses the structure of an asynchronously operated space-division-multiplex switching network.

In accordance with the present state of the art (cf. for example, "Elektrisches Nachrichtenwesen", Vol. 58, No. 4, 1984, pages 450 to 452) only space-division-multiplex switching networks are suitable for use as broadband switching networks. While time-division-multiplex switching networks require a synchronous-mode operation using the central node clock (office clock), it is in principle possible to use either synchronous-mode operation or asynchronous-mode operation in space-division-multiplex switching networks. Synchronous-mode operation is the most obvious mode for a clock synchronous broadband network, in which the node clocks can be derived from the already existing standard frequency distribution network. Synchronous-mode operation with common clocking of the signals during traversing of the switching network is, however, not without problems as, for high bit rates in the spatially extended (multi-stage) switching network, supplying the central network clock in its proper phase requires complicated adjusting measures. In the above-mentioned publication in "net", Vol. 39 (1985), No. 1, page 24 it is mentioned in this regard that because of the spatial expansion of the switching network arrangement and the high bit rate of the broadband signals it is not possible to regenerate the signal by a central clock at any desired position at low cost. Consequently the space-division-multiplex switching network is operated in the asychronous mode with individual clock processing for regenerating the signals during traversing of the switching network by means of a "clock-preserving" line code. A code of the type 5B-6B can be used as "clock-preserving" line code. The CMI (Coded Mark Inversion) interface code recommended by the CCITT can alternatively be used as the transmission code. The asynchronous-mode operation of the space-division-multiplex switching network has the advantage that it has a larger tolerance as regards time-delay jitter of the switching network components, but has the disadvantage that after through-switching of a circuit all the subsequent clock regenerators of the same hierarchic stage must synchronise themselves with the new clock. If a plurality of digital lines are to be combined in one digital multiplexer, then asynchronous multiplexers operating in accordance with a stuffing method are used. (cf. "ntz", Vol. 38, (1985), No. 3, pages 140 to 144).

In time-division-multiplex exchanges, the incoming data signals coming from a synchronous data network are taken over by the time-division-multiplex exchange with a clock determined by the modulation rate of these signals. After switch-through of the data signals in the time-division-multiplex exchange, these signals are conveyed with a correspondingly higher clock. If clock signals from different clock sources, which are plesiochronous with respect to the clock source of the time-division-multiplex exchange, coincide at the interface between the time-division-multiplex exchange and the data lines, then a clock adaption must be effected. The published German Patent Application DE-AS No. 24 20 437 discloses a method of adapting the clock of such plesiochronous signals. In that method, the incoming data signals are brought into phase with the clock of the time-division-multiplex exchange by means of line circuits arranged at the input end of the exchange. At the output end of the time-division-multiplex exchange, the data to be transmitted are again brought into phase with the clock raster of the time-division-multiplex exchange by means of a clock which is offset by the basic transit time of these data through the exchange. This clock has the same frequency as the clock at the input end. Afterwards the data are conveyed further.

SUMMARY OF THE INVENTION

The invention has for its object to provide, in a clock synchronous broadband communication network with asynchronously operated space-division-multiplex switching networks, through-switching without phase jump of broadband digital signals without the use of complicated stuffing methods.

This is object is accomplished by means of a method of through-switching broadband digital signals, without phase jump, in a synchronous broadband communications network, including:

(a) regenerating the broadband digital signals individually in an asynchronously operated space-division-multiplex switching network under control of respective individually recovered clock signals;

(b) applying the regenerated broadband digital signals, to a plurality of respective elastic stores, from respective output switching stages of the network under control of the respective individually recovered clock signals;

(c) reading the regenerated broadband signals from the elastic stores under control of a central network clock signal;

(d) generating a quiescent signal under control of the central network clock; and (e) switching between respective outputs of the elastic stores and the quiescent signal to produce digital output signals when regenerated broadband signals are not present in the elastic stores.

The method according to the invention has the advantage that a clock-synchronous network can be constructed in which asynchronously operated space-division-multiplex switching networks can be used in the nodes. Adapting the clock of the broadband digital signals to the central network clock is not effected at the input end as is the case for time-division-multiplex switching networks, but at the output end of the space-division-multiplex switching networks. In addition, the method according to the invention has the advantage that instead of asynchronous multiplexers, alternatively denoted stuffing multiplexers, synchronous multiplexers can be used. By switching to a broadband, network-synchronous signal in the event of a missing broadband digital signal, clock information is always transmitted through the digital line.

Another embodiment of the invention is an apparatus for through-switching broadband digital signals, without a phase jump, in a synchronous broadband communications network including:

(a) an asynchronously operated space-division-multiplex switching network including a device for regenerating a plurality of individual broadband digital signals under control of respective individually recovered clock signals, the regenerating device including an output regenerating device coupled to output switching stages of the network;

(b) a plurality of elastic stores, coupled to receive the regenerated broadband digital signals from the output regenerating device under control of the respective individually recovered clock signals, having respective outputs for providing the regenerated broadband digital signals under control of a central network clock;

(c) a device for generating a quiescent signal under control of the central network clock; and (d) a plurality of respective change-over switches, for selecting between signals at the outputs of the elastic stores and the quiescent signal under control of a signal from a switching network control.

Such an apparatus has the advantage that the elastic store can take over the task of compensating for "drift" (slow phase fluctuations). Such drift results, for example, from temperature differences in the digital lines and in the circuit components in the space-division-multiplex switching network. In this circuit arrangement, a buffer store at the input side of the space-division-multiplex switching network is no longer required. The buffer stores must be dimensioned so that transit time fluctuations between the applied central network clock and the clock of the incoming signals are compensated for. The value of the "drift" may be estimated to be approximately 3 ... 4 $\mu$s for the most disadvantageous case of a circuit between nodes of the upper network hierarchy level. To completely compensate for these fluctuations, the buffer length must correspond to twice the value of the "drift" which, for a bit rate of 140 Mbit/s results in a storage capacity of approximately 1000 bits. If, at the time of establishing a connection, the elastic store is adjusted to an average filling degree, then a significantly smaller storage capacity can be used because a shift in response to "drift" during an existing connection proceeds very slowly.

From "Frequenz", Vol. 38, (1984), No. 9, pages 217 to 223, more specifically page 222, left hand column, it is known to feed a substitute signal into the digital line in idle periods. This publication does not contain any suggestion for a switch-through without phase jump.

A further embodiment of the invention includes at least one device for hitless diversity switching signals appearing at respective outputs of the change-over switches, the hitless diversity switching device including:

a. at least one second change-over switch for selecting from a plurality of digital lines for transmission to a remote second asynchronously operated space-division-multiplex switching network;

b. a plurality of respective second regenerating devices at a far end of each digital line;

c. a plurality of respective second elastic stores coupled to respective outputs of the respective second regenerating devices to receive regenerated signals therefrom, under control of a second recovered clock signal, and having respective outputs for providing the regenerated signals under control of the central network clock signal; and d. at least one third change-over switch for selecting from the plurality of digital lines, for reception.

Such an apparatus has the advantage that when a digital line fails, a change-over to a substitute line can be effected without phase jump.

BRIEF DESCRIPTION OF THE DRAWINGS

The method according to the invention will now be described in greater detail with reference to two practical applications, illustrated in the accompanying drawing. Therein.

DETAILED DESCRIPTION OF THE PREFERRED EMBODIMENTS

Figure 1:
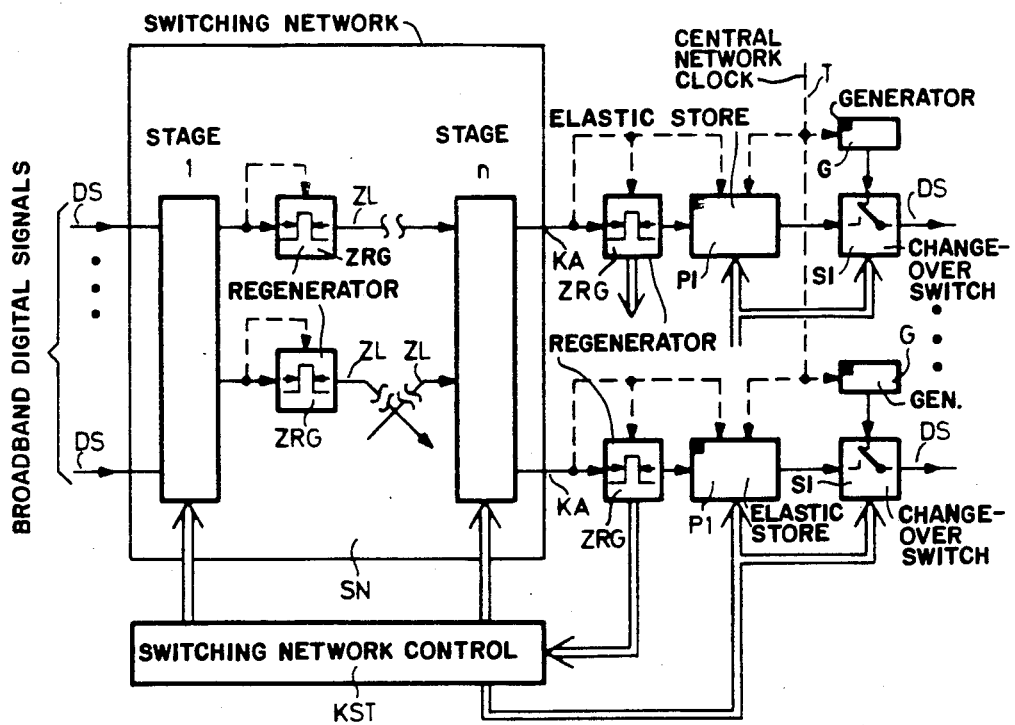
FIG. 1 shows a circuit arrangement provided at the switching network outputs.

In the network node represented in FIG. 1, the arrangements required for proper operation of the node but not directly related to the method according to the invention are not shown. To avoid the necessity of supplying a clock signal with an accurate phase at high bit rates, particularly in a large switching network SN having an extensive linkage wiring ZL, the switching network SN is implemented as an asynchronously operated space-division-multiplex switching network. As is shown in FIG. 1 a regenerator ZRG with individual clock extraction is provided at the output of each stage for signal regeneration. In the method according to the invention, the clock adaption of the broadband digital signals DS to the central network clock T is not effected at the input side as is customary for synchronously operated space-division-multiplex switching networks, but at the output side of the asynchronously operated space-division-multiplex switching network SN. The arrangements (elastic store P1 and change-over switch S1) incorporated in the output lines of the space-division-multiplex switching network SN ensure that, independent of the two switching states "switched-through" or "not switched-through", a network-clock-synchronous signal is transmitted without phase jump. The lines through which clock signals are conveyed are shown in FIG. 1 by means of broken lines and the control lines are represented by arrows.

An elastic store P1, in which the broadband digital signals DS are entered with the individually recovered clock of the useful signal switched-through in the switching network (broadband digital signal) and from which the signals are read at the central network clock T, is connected to each clock recovery circuit ZRG provided at the switching network output KA. For the "not switched-through" state it is possible to use the change-over switch S1 for effecting a phase-synchronous switch from the useful signal to a centrally clocked quiescent signal produced by the generator G. The change-over action is effected in response to a control command from a switching network control KST. In the embodiment shown in the drawing, the generator G is in the form of a store and the store content is cyclically read with the central network clock T, which is also applied to the elastic store P1.

Because the switching stages (1—n) are treated as line sections and an individual clock pulse recovery with corresponding signal regeneration is effected, the elastic store P1 can also perform the task of compensating for "drift", which is not only accumulated on the input line but additionally also in the switching network SN, so that a buffer store at the input side is no longer required. Consequently, also jitter and "drift" produced in the switching network SN itself can be compensated for. As the shift due to "drift" occurs only very slowly, it is possible, even when the elastic store P1 has a small storage capacity, to prevent spillage (loss or insertion of one or several consecutive bits in a binary signal) during the first period of a connection. To that end the pointer of the elastic store P1 is always set as the start of a connection in accordance with an average filling degree.

Figure 2:
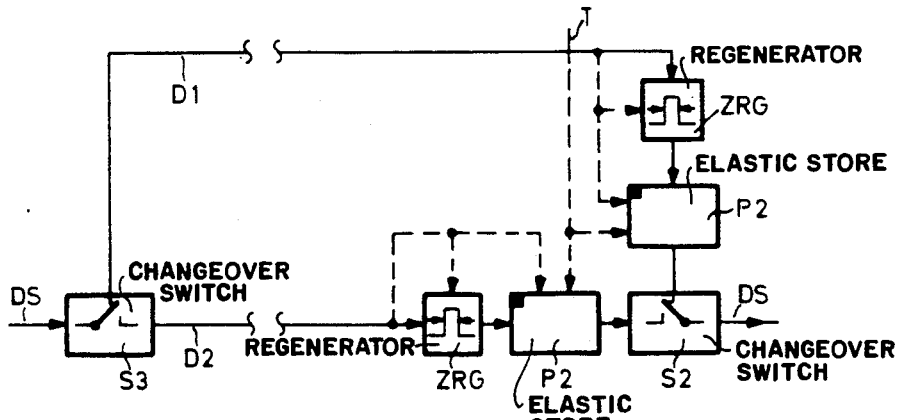
FIG. 2 shows a substitute path change-over using the method according to the invention.

FIG. 2 illustrates the change-over to a substitute path using the method according to the invention for digital lines D1, D2, . . . Such digital lines are arranged between a local exchange and a transit exchange or between two transit exchanges. An elastic store P2, whose input is connected to the regenerator ZRG at the line ends, and whose output is connected to a change-over switch S2 can be provided at the line end of each of the parallel digital lines D1, D2. With the aid of the change-over switches S2 and S3 it is now possible to effect the switch between the digital lines D1, D2 in response to a control command originating from a switching network control.

Using the method according to the invention it is possible to implement a synchronous broadband communication network with asynchronously operated space-division-multiplex switching networks SN and to switch broadband digital signals DS through without phase jump.

What is claimed is:

1. Apparatus for through-switching broadband digital signals, without a phase jump, in a synchronous broadband communications network comprising:
   (a) an asynchronously operated space-division-multiplex switching network comprising means for regenerating a plurality of individual broadband digital signals under control of respective individually recovered clock signals, said regenerating means including output regenerating means coupled to output switching stages of said network;
   (b) a plurality of elastic stores, coupled to receive said regenerated broadband digital signals from said output regenerating means under control of said respective individually recovered clock signals, having respective outputs for providing said regenerated broadband digital signals under control of a central network clock;
   (c) means for generating a quiescent signal under control of said central network clock; and
   (d) a plurality of respective change-over switches, for selecting between signals at said outputs of said elastic stores and the quiescent signal under control of a signal from a switching network control.

2. The apparatus of claim 1 comprising at least one means for hitless diversity switching signals appearing at respective outputs of said change-over switches, said hitless diversity switching means comprising:
   a. at least one second change-over switch for selecting from a plurality of digital lines for transmission to a remote second asynchronously operated space-division-multiplex switching network;
   b. a plurality of respective second regenerating means at a far end of each digital line;
   c. a plurality of respective second elastic stores coupled to respective outputs of the respective second regenerating means to receive regenerated signals therefrom, under control of a second recovered clock signal, and having respective outputs for providing said regenerated signals under control of said central network clock signal; and
   d. at least one third change-over switch for selecting from the plurality of digital lines, for reception.

3. The apparatus of claim 2 wherein:
   said network is in a transit exchange;
   said regenerators, said second elastic store, and said third change-over switch are in a local exchange comprising said second network;

so that said digital lines couple said local exchange to said transit exchange.

4. The apparatus of claim 2 wherein:

said network is in a first transit exchange;

said regenerators, said second elastic store, and said third change-over switch are in a second transit exchange comprising said second network;

so that said digital lines couple said first and second transit exchanges.

5. A method of through-switching broadband digital signals, without phase jump, in a synchronous broadband communications network, comprising:
   (a) regenerating the broadband digital signals individually in an asynchronously operated space-division-multiplex switching network under control of respective individually recovered clock signals;
   wherein the improvement comprises:
   (b) applying the regenerated broadband digital signals, to a plurality of respective elastic stores, from respective output switching stages of said network under control of said respective individually recovered clock signals;
   (c) reading the regenerated broadband signals from the elastic stores under control of a central network clock signal;
   (d) generating a quiescent signal under control of the central network clock; and
   (e) switching between respective outputs of the elastic stores and the quiescent signal to produce digital output signals when regenerated broadband signals are not present in said elastic stores.

6. The method of claim 5 further comprising the steps of:
   (a) second switching the output signal between a plurality of digital lines for transmission to a remote second asynchronously operated space-division multiplex network;
   (b) transmitting the output signal on a selected one of the digital lines;
   (c) second regenerating the output signal after transmission under control of a second recovered clock signal;
   (d) second applying the output signal to a second elastic store under control of said second recovered clock signal;
   (e) second reading the output signal from the elastic store under control of said central network clock signal; and
   (f) third switching the output signal from the selected digital line to said second network.

* * * * *